United States Patent
Scharf et al.

(10) Patent No.: US 12,429,432 B2
(45) Date of Patent: Sep. 30, 2025

(54) DAMAGE DETECTION BASED ON IMAGES WITH VARYING RESOLUTIONS

(71) Applicant: Concirrus Ltd., London (GB)

(72) Inventors: Ira Scharf, Newton, MA (US); Xiang Wen, Westwood, MA (US); Feng Pan, Belmont, MA (US); Paul Cummer, Cambridge, MA (US)

(73) Assignee: Concirrus Ltd., London (GB)

( * ) Notice: Subject to any disclaimer, the term of this patent is extended or adjusted under 35 U.S.C. 154(b) by 273 days.

(21) Appl. No.: 18/025,420

(22) PCT Filed: Sep. 3, 2021

(86) PCT No.: PCT/US2021/048980
§ 371 (c)(1),
(2) Date: Mar. 9, 2023

(87) PCT Pub. No.: WO2022/055795
PCT Pub. Date: Mar. 17, 2022

(65) Prior Publication Data
US 2024/0011917 A1    Jan. 11, 2024

Related U.S. Application Data

(60) Provisional application No. 63/077,013, filed on Sep. 11, 2020.

(51) Int. Cl.
*G01N 21/88* (2006.01)
*G06T 3/4053* (2024.01)
(Continued)

(52) U.S. Cl.
CPC ....... *G01N 21/8851* (2013.01); *G06T 3/4053* (2013.01); *G06T 7/0008* (2013.01);
(Continued)

(58) Field of Classification Search
CPC .... B64G 1/1021; B64G 1/1028; G06Q 50/26; G06N 3/08; G01N 21/8851;
(Continued)

(56) References Cited

U.S. PATENT DOCUMENTS 10,169,856 B1   1/2019   Farnsworth et al.
2017/0193680 A1*  7/2017   Zhang ................... G06V 10/82
(Continued)

FOREIGN PATENT DOCUMENTS

| | | |
|---|---|---|
| CN | 111126308 A | 5/2020 |
| JP | 2019175015 A | 10/2019 |
| KR | 10-2017-0138225 A | 12/2017 |

OTHER PUBLICATIONS

International Search Report and Written Opinion, PCT Application No. PCT/US2021/048980, mailed Dec. 23, 2021 (7 pages).

*Primary Examiner* — Peter B Kim
(74) *Attorney, Agent, or Firm* — Occhiuti & Rohlicek LLP

(57) ABSTRACT

Disclosed are devices, systems, apparatus, methods, products, and other implementations, including a method for detecting damage in a geographical area that includes receiving a first image of the geographical area, with the first image having a first resolution, and detecting damage to at least one object appearing in the first image in response to applying a trained learning engine to the first image. The learning engine is trained to detect damage in geographical areas based on received one or more images in a second set of images having a second resolution higher than the first resolution, and based on one or more images in a first set of images having the first resolution. The one or more images in the first set of images and the one or more images in the second set of images include one or more overlapping portions in which one or more objects appear.

20 Claims, 5 Drawing Sheets

(51) Int. Cl.
*G06T 7/00* (2017.01)
*G06V 10/24* (2022.01)
*G06V 20/13* (2022.01)
*G06V 20/17* (2022.01)

(52) U.S. Cl.
CPC ............ *G06V 10/245* (2022.01); *G06V 20/13* (2022.01); *G06V 20/17* (2022.01); *G06T 2207/20081* (2013.01); *G06T 2207/20084* (2013.01)

(58) Field of Classification Search
CPC . G06T 2207/10036; G06T 2207/10048; G06T 2207/20016; G06T 2207/20081; G06T 2207/20084; G06T 2207/30181; G06T 2207/30204; G06T 3/4053; G06T 7/0008; G06T 7/33; G06V 10/245; G06V 10/803; G06V 10/82; G06V 20/13; G06V 20/17
See application file for complete search history.

(56) References Cited

U.S. PATENT DOCUMENTS

| | | |
|---|---|---|
| 2018/0089763 A1 | 3/2018 | Okazaki |
| 2020/0098101 A1* | 3/2020 | Pandey ................. G06T 3/4053 |

* cited by examiner

DAMAGE DETECTION BASED ON IMAGES WITH VARYING RESOLUTIONS

CROSS REFERENCE TO RELATED APPLICATIONS

This application is a 371 national stage of international application no. PCT/US2021/048980, filed Sep. 3, 2021, which claims priority to U.S. Provisional Application No. 63/077,013, filed Sep. 11, 2020, the contents of which are herein incorporated by reference.

BACKGROUND

Natural disaster events, such as fires, flooding, earthquakes, etc., can cause substantial structural damage to large swaths of geographical areas. To assess the economic damage resulting from the occurrence of such natural disasters, overhead photographs can be used. However, the level of detail in such photos varies according to the equipment that may have been used to capture the photos, the altitude at which the photos were taken, and a host of other factors that can complicate the accuracy of damage assessment. Furthermore, when human appraisers review photographs for damage assessment purposes, the assessed economic damage can depend on the skill level of the appraiser, on the quality of the photos being used, assessment biases of the appraisers, and other factors. This can lead to damage assessment errors, and/or to lack of consistency in the assessments computed.

SUMMARY

Disclosed are systems, methods, and other implementations to detect/estimate damage suffered by objects (e.g., physical structures, such as buildings) based on low-resolution images (typically satellite images/photos) taken of the geographical area surveyed. The detection can be performed using an adaptable learning engine trained using a combination of high-resolution images (e.g., obtained using high-resolution, high precision image capture devices that obtain aerial images/photos from low flying platforms such as airplanes or drones) and counterpart low-resolution images photos (e.g., taken using high-altitude platforms, such as a satellite vehicles). Once the learning engine is trained to implement a detection model, e.g., to detect objects and/or assess physical damage, subsequent low-resolution images (from satellite vehicles, which regularly pass over a geographical area) can be used to detect damage that may have been sustained by one or more objects appearing in the low-resolution images. A trained learning engine (machine) can also be used to detect objects and damage from low-resolution images that do not necessarily have high-resolution counterpart images. This is because the learning engine's training may be robust enough (if a sizable and diverse training data is used that does not focus on a particular geographical area) to allow good performance by the learning-engine.

Thus, in some variations, a method for detecting damage in a geographical area is provided that includes receiving a first image of the geographical area, with the first image having a first resolution, and detecting damage to at least one object appearing in the first image in response to applying a trained learning engine to the first image. The learning engine is trained to detect damage in geographical areas based on received one or more images in a second set of images having a second resolution higher than the first resolution, and based on one or more images in a first set of images having the first resolution. The one or more images in the first set of images and the one or more images in the second set of images include one or more overlapping portions in which one or more objects appear.

Embodiments of the method may include at least some of the features described in the present disclosure, including one or more of the following features.

The method may further include receiving at least one image from the second set of images having the second resolution, the at least one image associated with at least one image from the first set of images, and updating the learning engine based on the at least one image having the second resolution, and the associated at least one image from the first set of images.

Updating the learning engine may include associating the at least one image from the second set of images set with the at least one image from the first set of images in response to a determination that the at least one image from the second set of images and the at least one image from the first set of images were captured at approximately the same time, and training the learning engine according to a ground truth training set comprising the at least one image from the second set of images and the associated at least one image from the first set of images. The at least one image from the second set of images and the associated at least one image from the first set of images may define a ground truth image set for updating the learning engine.

Associating the at least one image from the second set of images with the at least one image from the first set of images may include aligning the at least one image from the second set of images set with the at least one image from the first set of images.

Aligning the at least one image from the second set of images set with the at least one image from the first set of images may include aligning the at least one image from the second set of images set with the at least one image from the first set of images according to geo-referencing information associated with the at least one image from the second set of images and with the at least one image from the first set of images.

Aligning the at least one image from the second set of images set with the at least one image from the first set of images may include identifying markers in the at least one image from the second set of images and in the at least one image from the first set of images, and registering in the at least one image from the second set of images, the at least one image from the first set of images, or both to a common frame of reference to align at least some of the markers in the at least one image from the second set of images with respective markers in the at least one image from the first set of images.

Aligning the at least one image from the second set of images set with the at least one image from the first set of images may include aligning the at least one image from the second set of images and the at least one image from the first set of images based on image perspective information associated with the respective at least one image from the second set of images and the at least one image from the first set of images.

Training the learning engine according to a ground training set comprising the at least one image from the second set of images and the associated at least one image from the first set of images may include generating detection data for the at least one image from the second set of images according to a model that is based on damage detection from images having the second, higher, resolution, and training the learning engine to generate data, responsive to the associated at least one image from the first set of images, consistent with the detection data generated according to the model based on damage detection from images having the second, higher, resolution.

The learning engine may include one or more artificial neural networks.

The first set of images and the second set of images may include aerial photos of the geographic location. The aerial photos included in the first set of images may be captured by an image capturing device carried by a satellite vehicle. The aerial photos included in the second set of images may be captured by image capture devices on one or more of, for example, a satellite vehicle, and/or an aerial vehicle.

The first set of images and the second set of images may include subsets of images, with each subset associated with a time instance, and with each interval between consecutive time instances associated with subsets from the first set of images being shorter than any interval between consecutive times instances associated with subsets from the second set of images.

The method may further include generating additional at least one image for the second set of images based on one or more subsets of images, and associating the additional at least one image with a time instance derived based on the one or more subsets of images.

Generating the additional at least one image may include one or more of, for example, performing image synthesis operations on the one or more subsets of images, and/or applying interpolation operations to two or more subsets of images from the second set of images.

The method may further include associating the additional at least one image of the second set of images with a further at least one image from the first set of images in response to a determination that the additional at least one image from the second set of images and the additional at least one image from are associated with approximately a same time instance, and training the learning engine according to a ground training set comprising the additional at least one image from the second set of images, generated based on the interpolation operations, and the associated additional at least one image from the first set of images.

In some variations, a system is provided that includes a communication interface to receive a first image of a geographical area, with the first image having a first resolution, and a controller, implementing one or more learning engines, coupled to the communication interface, and further coupled to a memory device to store programmable instructions to detect damage to at least one object appearing in the first image in response to applying a trained learning engine to the first image. The learning engine is trained to detect damage in geographical areas based on received one or more images in a second set of images having a second resolution higher than the first resolution, and based on one or more images in a first set of images having the first resolution. The one or more images in the first set of images and the one or more images in the second set of images include one or more overlapping portions in which one or more objects appear.

Embodiments of the system may include at least some of the features described in the present disclosure, including at least some of the features described above in relation to the method, as well as one or more of the following features.

The communication interface may be configured to receive at least one image having the second resolution, the at least one image associated with at least one image from the first set of images, and the controller may be configured to update the learning engine based on the at least one image having the second resolution, and the associated at least one image from the first set of images.

The controller configured to update the learning engine may be configured to associate the at least one image from the second set of images set with the at least one image from the first set of images in response to a determination that the at least one image from the second set of images and the at least one image from the first set of images were captured at approximately the same time, and train the learning engine according to a ground training set comprising the at least one image from the second set of images and the associated at least one image from the first set of images. The at least one image from the second set of images and the associated at least one image from the first set of images may define a ground truth image set for updating the learning engine.

In some variations, a non-transitory computer readable media is provided, storing a set of instructions executable on at least one programmable device, to receive a first image of a geographical area, the first image having a first resolution, and detect damage to at least one object appearing in a first image in response to applying a trained learning engine to the first image. The learning engine is trained to detect damage in geographical areas based on received one or more images in a second set of images having a second resolution higher than the first resolution, and based on one or more images in the first set of images. The one or more images in a first set of images and the one or more images in the second set of images include one or more overlapping portions in which one or more objects appear.

Embodiments of the non-transitory computer readable media may include at least some of the features described in the present disclosure, including at least some of the features described above in relation to the method and to the system.

Advantages of the embodiments described herein include improvement in the accuracy of a low-resolution detection model (i.e., a learning engine implementing detection of damage from low-resolution images) by matching the output generated by the low-resolution model to output generated based on counterpart high-resolution images (when such images are available). Because objects, and damage sustained by some objects, that are detected from a high-resolution image for a particular geographical area, at some particular time instance, have to match the objects and damages that are detected, for the same geographical area at approximately the same time instance, from a low-resolution image, the output generated for the high-resolution image (be it output provided by a separate and independent learning model for high-resolution images, output determined based on image processing filtering, or user-provided annotation output) can define a close or near ground truth to train the low-resolution model in real-time fashion (in other words, the high-resolution image can be thought of as the ground truths of the low-resolution image).

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
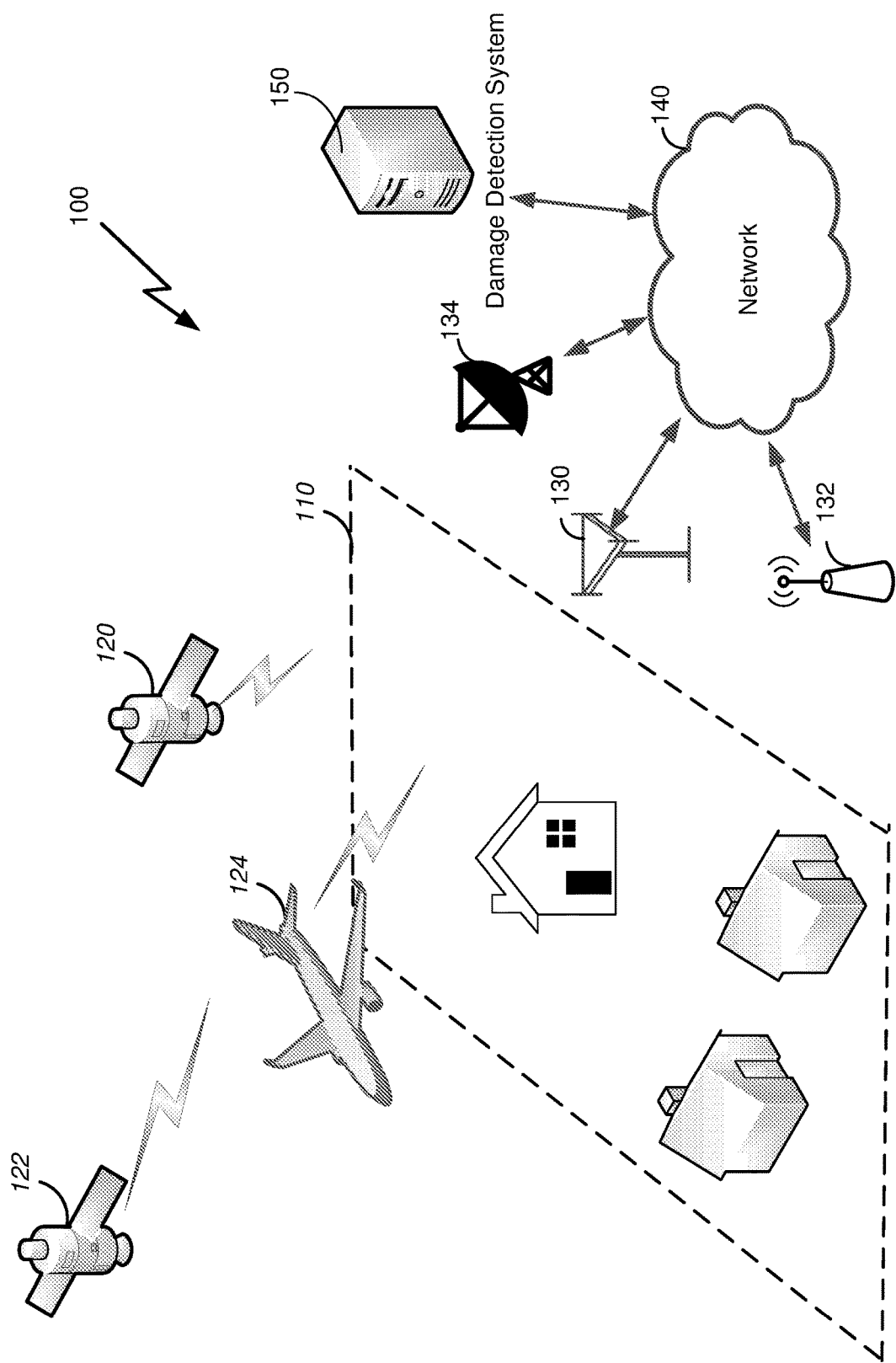
FIG. 1 is a diagram of an example system to detect damage in a geographical area using an adaptable learning-engine, trained with images of geographical areas obtained from two or more image-capture devices with different resolutions.

FIG. 1 is a diagram of an example system 100 to detect damage in a geographical area 110 using an adaptable learning-engine-based implementation that is updated (and in some situations, is initially trained), using images of geographical areas obtained from two or more image-capture devices with different resolutions. For example, an output of a high-resolution detection model is used as an approximation for ground truth to train a low-resolution model that produces detection/classification output based on low-resolution data. Because the low-resolution input has a high refresh rate (the data is obtained more readily/frequently than the high-resolution data), low-resolution data can provide a more immediate damage detection output. However, to improve the accuracy of the low-resolution model, the less frequent (low refresh rate) high-resolution data, which generally includes finer details and may more accurately capture features of a scene that are too small to be properly resolved from the corresponding low-resolution data, is used to produce ground truths approximation for the low-resolution data so as to create a trained correspondence between the output of the low-resolution model and the output of the high-resolution model.

More particularly, the system 100 includes multiple platforms, such as the satellite vehicles 120 and 122, and an aerial vehicle 124, which in the example of FIG. 1 is an airplane. Other types of vehicles (e.g., balloons, unmanned autonomous vehicles (UAV) such as a multi-rotor aircraft) may also be used. Generally, each of the aerial platforms is equipped with image-capture devices (not shown), that may be configured to capture and record signals inside and also outside the visible range (e.g., in the infrared range, near infrared range, short wave infrared range, and other bands on the electromagnetic spectrum). Examples of image-capture devices include a charge-coupled device (CCD)-based capture unit, a CMOS-based image sensor, etc., which may produce still or moving images. An image capture device may also include optical components (e.g., lenses, polarizers, etc.) to optically filter/process captured light data reflected from the physical object, before the optically filtered data is captured by the capture unit of the image capture device. The captured data may then be written to a memory/storage device in communication with the capture unit, and/or may be transmitted to ground station communication nodes, which in FIG. 1 are depicted as a WWAN base station 130, an WLAN access point 132 (either of the nodes 130 and 132 may be configured to establish communication links to low flying aerial vehicle 124), and a satellite communication node 134 configured to transmit and/or receive signals to and from satellite vehicles 120 and/or 122. In some embodiments, the image-capture device may be locally coupled to processing/computing devices that are configured to implement initial processing on captured image data, such as, for example, perform calibration operations, compress or arrange raw image/video data (provided to it by the capture unit) into a suitable digital format such as a Tagged Image file (TIF) formatted images, JPEG images, or any other type of still image format, or into a digital video format (such as MPEG).

The characteristics of the image-capture implementations at the various platforms result in different image resolutions and data-capture frequencies (also referred to as refresh rates) that these implementations achieve. For example, the satellite vehicles 120 and 122 orbit the earth at a relatively high altitude above the geographical area 110, and consequently, even if equipped with a high-resolution image-capture device (complemented by a high-performing optical assembly) will generally achieve low-resolution images of geographical areas over which the satellite vehicles pass. On the other hand, satellite vehicles can be controlled to frequently pass over the target geographical area 110 that is to be imaged, and thus to obtain multiple images in some pre-determined interval of time (e.g., 1 day, 1 week, etc.) In contrast, the low-flying aerial vehicle 124 can be configured to obtain aerial images/photos of the geographical area 110 at a much higher resolution than what the satellite vehicles 120 and 122 can obtain, but the regularity of having the aerial vehicle 124 pass over the geographical area 110 is more difficult to schedule (in part because it requires close monitoring and controlling, and in part because weather conditions would be more impactful on the scheduling of flight passes by the low flying aerial vehicle). Nevertheless, and as will be discussed in greater detail below, infrequently procured high-resolution images can be used in combination with more frequently-procured low-resolution images to train a learning-engine-based damage detector, implemented, for example, on a computing-based system 150, to detect objects, and potential damage thereto, based on the low-resolution images obtained by the more regularly passing satellite vehicles 120 and/or 122. While in the example provided herein the satellite vehicles 120 and 122 are shown as the platforms obtaining lower resolutions images, while the aerial vehicle 124 obtains higher resolution images, in some situations, only the satellite vehicles may be available to obtain images (i.e., the aerial vehicle 124 may not be available). In such examples, one of the satellite vehicles may be configured to obtain the more frequent, but lower resolution images, while the other satellite vehicle (e.g., orbiting at a lower altitude than the first satellite vehicle) may be configured to obtain the less frequent, but higher resolution images.

Figure 2A:
FIG. 2A includes a pair of images of a particular geographical area, with one image being of a higher resolution than that of the other image.
Figure 2A:
Figure 2B:
FIG. 2B includes a resultant pair of labelled images derived from the high resolution and low-resolution images of FIG. 2A.

FIG. 2A shows an example pair of images 200 and 210 of a particular geographical area, with the image 200 being of a higher resolution than that of the image 210. Both images contain the same objects/features (although it is more difficult to resolve objects/features from the lower resolution image 210), and thus, this correspondence between features can be used to identify and match up the objects/features appearing in the two images and to train the learning engine to recognize features and objects when only a low-resolution image is available. FIG. 2B includes resultant marked/labelled images 220 and 230 derived from the high resolution and low-resolution images of FIG. 2A. The high-resolution image 220, produced from the image 200, and the low-resolution image 230, derived from the low-resolution image 210 of FIG. 2A, are shown following application of a segmentation or labelling process (such processing may have been performed automatically by a segmentation/labeling process that can be based on a separate learning model, or performed manually by a user manually segmenting or labelling features for training purposes). The segmented images 220 and 230 identify (or mark) the objects as polygons, although other shapes may be used. The identification of features using, for example, geometrical labels/shapes allows the correspondence between features in the two images (the high- and low-resolutions images) to be established and matched up, thus training the learning engine to implement a low-resolution detection model to recognize and identify features appearing in subsequent low-resolution images for which there are no corresponding high-resolution counterpart images (as will be discussed in greater detail below, different types of learning engines, e.g., a recurrent neural network, a feed-forward neural networks, different types of classifiers, etc., may be used to implement the damage detection models described herein). In the example of FIG. 2B, the segmented image 220 includes a feature 222, which corresponds to a feature 232 appearing in the segmented image 230. Complex irregular polygonal shapes (to overlay or replace the actual raw features) can be derived for features appearing in the image based on optimization processes, for example, an optimization process that fits the best closed polygon to a detect features, subject to certain constraints (e.g., minimal line length for each segment of the polygon, minimal area enclosed by the polygon, etc.) Alternatively, other markers (geometrical shapes, such as circles or dots, letters, etc.) may be used to mark/label images to produce the resultant labelled images.

With continued reference to FIG. 1, the two or more platforms obtaining image data for the geographical area 110 transmit the acquired image data (suitably encoded and formatted) to ground station communication nodes (e.g., one or more of the nodes 130, 132, or 134), and the data is communicated from there to the damage detection system 150 via a network 140 (which may be a packet-based network, such as the public Internet), or via wireless transceivers (not shown) included with the damage detection system 150. In addition to the image data transmitted to the damage detection system 150, the platforms acquiring the image data may also transmit positioning information, which may include their image-capture device's relative positions to the geographic area 110, and/or absolute positions (in a real-world coordinate system provided, for example, as accompanying geo-reference data). The transmissions to the damage detection system 150 may also include timing information. Upon receiving image data (e.g., a set of images, transmitted from a platform, such as the satellite vehicle 120 or 122, that acquired low-resolution images of the geographical area 110), the damage detection system 150 detects damage to at least one object appearing in a first image from the received set of images by applying a detection model (implemented on a learning engine) to the first image. The system 150's learning engine is trained to detect damage in the geographical area based on high-resolution images received from another platform (acquiring high-resolution images) and based one or more images received from the low-resolution platform (those images are generally different images than those being processed by the learning engine to determine/detect damage to one or more objects). When training the learning engine, the one or more low-resolution images and the one or more high-resolution images include one or more overlapping portions in which one or more objects appear (that allows correspondences and relationships between the high-resolution and low-resolution images to be established and learned by the learning engine(s) of the damage detection system 150).

Figure 3:
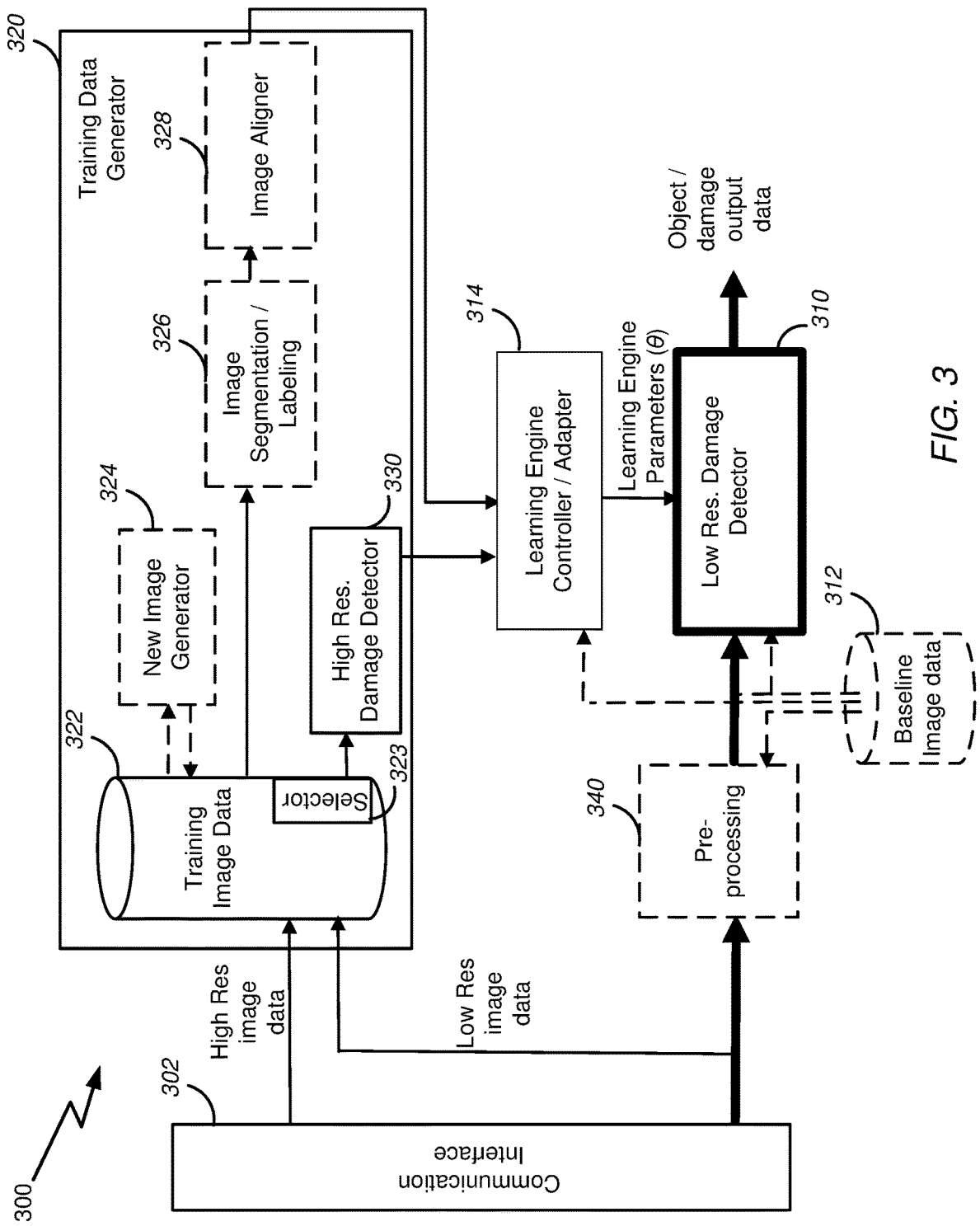
FIG. 3 is a block diagram of an example damage detection system.

More particularly, and with reference to FIG. 3, a block diagram of an example damage detection system 300, which may be similar to the system 150 of FIG. 1, is shown. The system 300 includes a low-resolution damage detector 310 (which may be implemented using one or more neural networks or other types of learning machines) to identify objects in an image, and/or to detect damage to one or more of such identified objects (and/or determine damage estimate). When only a low-resolution image is available, processing follows the boldface line via a low-res damage detector 310 to process the low-res image to yield damage output data. As discussed below, the low-res damage detector is configured with parameters, which may be general an appropriate to varied conditions, but are preferably determined based, at least in part, on high-res images when available.

Continuing to refer to FIG. 3, referring to the data paths not in boldface, to implement the determining of the parameters of the low-res detector 310, the system 300 further includes a learning engine controller/adapter 314 configured to determine and/or adapt the parameters (e.g., neural network weights) of the learning engine that would produce output representative of detected objects and/or detected damage appearing in a low-resolution image, and a training data generator 320 that produces the training data provided to the learning engine controller/adapter 314. To train the damage detector 310, corresponding (i.e., covering overlapping ground area at the same or approximately same time) high-resolution image data and low-resolution image data are regularly provided (e.g., from one or more of the vehicles 120, 122, or 124 of FIG. 1) to the system 300, and are stored (after being received by a communication interface 302 that can connect to a wired or wireless network) in a training image data repository 322. An image selector 323, interfaced with the data repository 322, may be used to select appropriate images for further processing, e.g., to select a high-resolution image corresponding to some required geographical location/area and time constraints, and select the counterpart low-resolution image corresponding to the selected high-resolution image. Initially, the training data generator 320 may be used to train the low-resolution damage detector 310 with a sizable volume of image data (that may or may not include high resolution data) that may relate to the specific geographical area 110 that is to be monitored for possible damage, or more generally trained to analyze image data from any arbitrary geographical area (the more specific the training is, the higher the accuracy and confidence level associated with the output generated by the damage detector). After the low-resolution damage detector has been initially trained and has become operational to process actual contemporaneous data, subsequent training may be intermittently performed (at regular or irregular periods). For example, upon the acquisition of new high-resolution data, such high-resolution data may be used to perform a training update of the damage detector 310 (i.e., the damage detector is dynamically adaptive, and its behavior adjusted as conditions change). Thus, in embodiments in which intermittent updates may be performed, the damage detection system 300 (or the system 150 of FIG. 1) is configured to (e.g., by the training data generator 320 and the learning engine controller/adapter 314) receive at least one further high-resolution image, with the at least one further image associated with at least one image from a set of low-resolution images (which may already have been received, and possibly stored in the repository 322, and may already have been processed by the damage detector based on the damage detector's previous trained state). The training data generator 320, in conjunction with the learning engine controller/adapter 314, is further configured to update the damage detector 310 based on the at least one further high-resolution image, and the associated at least one image from the set of low-resolution images. In some embodiments, the training data generator 320 configured provide the inputs to the learning engine controller 314 to update the damage detector may also be configured to associate the at least one further high-resolution image with the at least one image from the set of low-resolution images in response to a determination that the at least one further high-resolution image and the at least one low-resolution image were captured at approximately the same time (e.g., within minutes, or hours, or any other appropriate time frame), as may be indicated by timing information associated with the image data. The at least one further high-resolution image and the associated at least one low-resolution image may thus define a ground truth data set for updating the damage detector.

To train the low-resolution damage detector 310, data that represents the relationship between the detection data produced based on the high-resolution image data, and corresponding low-resolution image data, needs to be provided. Thus, as shown in FIG. 3, the training data generator 320 includes a high-resolution damage detector 330 that produces detection data responsive to one or more high-resolution images with output that should be similar to that of the low-resolution damage detector 310 when presented with a corresponding low-resolution image. For example, the high-resolution damage detector 330 can implement a high-resolution model (e.g., based on a separate and independent learning engine) that produces prediction data representative of detected objects and/or discernable from the more detailed (and thus more accurate) high-resolution images. Generally, the high-resolution damage detector 330 is trained separately from the low-resolution damage detector 310 of FIG. 3, using, for example, a high-resolution training set. In some embodiments, the low-resolution image detector may have been initially trained using a low-resolution image training set (defining a ground truth), and subsequently (e.g., after the low-resolution damage detector 310 becomes operational), the detector 310 can adaptively be trained as high-resolution image data corresponding to the low-resolution image data becomes available. The output of the high-resolution image detector can be provided in the form of vectors/matrices identifying specific locations (with optional description associated with such locations), or simpler indicators (e.g., providing an indication that damage was detected or not detected). Alternatively, the high-resolution damage detector 330 produces a labelled/marked image (in a manner similar to that discussed below in relation to the unit 326) identifying features or objects (e.g., areas covered with water, areas damaged by fire, structures) appearing in the image. In embodiments in which the data produced by the unit 330 comprises marked/labelled images, such labelling may have been produced by a learning engine trained according to a model that outputs annotations (e.g., geometric shapes overlaid on the original or filtered image), or may have been produced using image processing filtering techniques (e.g., filters to detect image features such as edges, and other types of features). In yet other embodiments, the output of the high-resolution damage detector 330 may be provided through manually added annotations by a trained user (such training annotation may be provided via a user interface, not shown).

The output data produced by the high-resolution damage detector 330 reflects a generally more accurate resultant output for features and damage that are present in a certain geographical area. Because the same features and damages would also be present in a low-resolution image of the same geographical area (at approximately the same time), the data produced by the high-resolution damage detector 330 can be matched up with low-resolution data (be it raw images or a processed version of the raw data) to train the low-resolution damage detector 310. The output of the high-resolution damage detector 330, in combination with the corresponding low-resolution image data thus defines approximate ground truth training data to dynamically adapt or train (in real-time) the damage detector 310 to more accurately detect features and damage based on more readily available (i.e., more frequent) low-resolution image data.

As further shown in FIG. 3, to facilitate the training of the damage detector 310 to correctly identify features and damage appearing in a low-resolution image based, in part, on data detected for a counterpart high-resolution image, the high-resolution images and their corresponding low-resolution counterparts need to be aligned Alignment between low resolution images and their high-resolution counterparts may be achieved via georeferencing techniques. For example, the various low-resolution and high-resolution images used by the system 300 may include supplemental information (e.g., in the form of the metadata) relating the internal coordinate system of the image (e.g., the center of the image may be designated as a center of origin of the image's coordinate system) to real-world coordinate system. Thus, when geo-referencing information is available for the various images used by the system, image coordinates can be transformed to the real-world coordinate system (and vice versa). Furthermore, since low-resolution and high-resolution images can be expressed based on a common real-world coordinates, the correspondence between points (or features) visible in one image (e.g., the low-resolution image) and the points (or features) in the counterpart image (e.g., the high-resolution image) can be determined.

Optionally, in circumstances where the high-resolution image and its low-resolution counterpart do not include geo-referencing data, the training data generator 320 may include an image aligner 328. The image aligner 328 may be configured to align high and low-resolution images based on various alignment processes (also referred to as registration processes). For example, in some embodiments, the alignment may be based on information provided by inertial navigation sensor measurements of the platforms that acquired the images. Such information may include, for example, camera position data for the acquiring camera, camera attitude data (including roll, pitch, and heading), etc. That inertial navigation information can also be used to normalize the corresponding image data to produce, for example, nadir view normalized images, providing a top-view of the scene, that eliminates or reduces any perspective/angle views in the image (nadir-view normalization can be performed for both the low-resolution images and the high-resolution images). Based on the inertial sensor measurements, geometry correction for the various images can be performed to rotate, or otherwise manipulate the image's pixels according to formulations that can be derived based on the inertial sensor measurement data. For example, the relative perspective of each of camera (mounted on one of the aerial or satellite vehicles) can be used to derive a transformation that is applied to the image data to yield a resultant image corresponding to a top-view of the scene. In addition to normalizing each of the images to a nadir view normalized image, at least one of a pair of images generally needs to be aligned with the other image (so that the two images that are used to train the learning images correspond to the same frame of reference). Here too, inertial navigation sensor measurements by respective sensors of two platforms that acquired the two images to be aligned, may be used to compute the relative perspective of one (or both) acquiring image-capture device(s) to a common frame of reference, which may the frame of reference used by the other of the pair of images. This relative perspective information can, in turn, be used to derive a transformation matrix to be applied the image that is to be aligned. In some embodiments, alignment of the two images may be performed by first segmenting or labeling the two image to identify matching objects (i.e., objects/structures appearing in one image, e.g., roofs of houses, and the corresponding same objects/structures appearing in the other image). Image segmentation, to identify features, may be performed by the optional image segmenter 326 shown in FIG. 3. The image segmenter 326 is configured to identify features/objects appearing in an image being processed, and to mark those features using geometric shapes such as polygons (as shown in FIG. 2B) or with some more complex polygon shape that tracks/resembles the feature or object detected. There are various techniques and procedures to detect features in an image. One methodology would be to use a learning engine (e.g., a neural network) configured to identify and/or mark features and objects appearing in an image (such a learning engine may be independent of the damage detector 310 or any learning engine used to implement the high-resolution damage detector). Another possible methodology that may be used, is to apply filtering to the image (e.g., edge detection filtering, morphological filtering, etc.) in order to detect various features, such as edges, corners, blobs, etc. The shapes and relative dimensions of the resultant artefacts can then be used to determine the likely objects corresponding to the resultant features. In some examples, feature identification may be performed manually by a trained user who marks or labels an image with notations and other features (boxes) corresponding to certain objects in the images. Typically, the markings provided by the trained user would be made for the high-resolution images and the low-resolution images.

Regardless of which process or approach is used, the image segmenter 326 can produce a segmented/labelled image that contain marked features (e.g., geometric shapes overlaid on the original images). In some embodiments, the segmentation of the counterpart high-resolution image may also be performed by the segmenter 326, or may be separately performed by a dedicated segmenter module for the high-resolution images (e.g., implemented as part of the high-resolution damage detector 330). The two segmented images (low-resolution and high-resolution) can next be aligned by, for example, rotating one image so that the marked features in one image (e.g., the low-resolution image) most optimally match the marked features in the other image (e.g., the high-resolution). Because generally the marked features in one image will not be identical (in size or orientation, or even shape) to the other image, aligning based on identified/labelled features usually involves some optimization process (e.g., to minimize some error function or cost function relating to the matching of features from one image to the features of the other image). The optimization procedure to match the marked features can thus yield the parameters of a transformation matrix to apply to the image being aligned. In some embodiments, segmentation of the low-resolution image can be used to not only properly align it with a corresponding high-resolution image, but also, optionally, to define the training data used to train or adapt the damage detector 310. For example, the segmented 326 can be used to generate geometric shapes representative of features appearing in the image, and use those features to train the damage detector 310 to detect such features, and the damage thereto, in low-resolution images. In such embodiments, the segmenter 326 may be implemented downstream of the aligner 328. On the other hand, in embodiments in which the features that are to be detected correspond to fire or water damage (i.e., where specific discrete features may be less critical to assessment of damage), the segmenter 326 may not be needed to mark or label the low-resolution image for training purposes.

Having processed high and low-resolution images, the output produced from those images now defines a sample of the (approximated) ground truth that is used to train the damage detector 310 of the system 300 (offline and/or during runtime), and is provided to the learning engine controller/adapter 314. When the damage detector is implemented as a neural network, the training is used to define the parameter values (weights), represented as the vector θ) assigned to links of the neural network, e.g., based on a procedure minimizing a loss metric between predictions made by the neural network and labeled instances of the data (for example, a stochastic gradient descent procedure may be used to minimize the loss metric). The computed parameter values may be stored at a memory storage device (not shown) coupled to the damage detector 310 and/or to the controller/adapter 314.

As noted, subsequent to the commencement of regular operation on of the damage detection system 300, the damage detector's configuration may be updated intermittently (e.g., as new high-resolution data is received from a high-resolution platform). Thus, in such situations, the training data generator 320 may be configured to process the new high-resolution image via the high-resolution model/data generator 330 so as to produce model data (derived based on the accurate newly arrived high-resolution image) and/or produce other output (e.g., marked/labelled version of the high-resolution image), and (when needed, e.g., when geo-referencing data is not available) to align at least one further high-resolution image (received subsequent to the initial training and the commencement of operation of the system 300) with at least one low-resolution image. In embodiments in which image perspective information is provided by the platforms at which the respective images were acquired (e.g., information obtained from inertial navigation sensors of the platforms), the training data generator 320 is configured to align the at least one further high-resolution image and the at least one low-resolution images based on image perspective information associated with the respective at least one further high-resolution image and the at least one low-resolution image. In example where alignment is based on identifying and marking features on the high and low-resolution images, the training data generator 320 is configured to identify markers (e.g., automatically by the image segmenter 326, or manually by a user labeling the images) in the at least one further high-resolution image, and in the at least one low-resolution image, and register (align) the at least one further high-resolution image, the at least one low-resolution image, or both, to a common frame of reference to align at least some of the markers in the at least one further high-resolution image and the respective markers in the at least one low-resolution image. The training set may include not only high-resolution images (and their matching low-resolution counterparts) for geographical areas that have not suffered any damage, but also low-resolution images (and possibly high-resolution counterparts) in which damaged objects (structures) appear. Thus, the trained damage detector may not only be able to identify objects from low-resolution images, but may also be able to detect damage that may have been sustained by such identified objects. In some embodiments, the training data generator 320 may optionally include an image generator (shown schematically in FIG. 3 as module 324) to generate additional high-resolution images that may be used to supplement the training set (so as to have more samples to match up to the more frequently occurring low-resolution images). Such an image generator may be implemented as an image synthesis module to expand training datasets. Image synthesis is the generation of realistic images using machine learning, implementing a machine learning model, such as generative adversarial networks (GANs), for generating content. The image-to-image translation may be realized using different types of neural networks (such as cycle-consistent adversarial networks, image super-resolution), which learn the mapping between input images in one domain and output image in another domain. In such a case, one domain could be high resolution imagery and another domain could be low resolution imagery, or vice versa.

In some examples, the image generator to produce new high-resolution images may be implemented to generate images through interpolation of two or more actual high-resolution images. Various interpolation techniques may be used to generate new images, and those interpolation techniques can be varied and adapted according to specific images provided to the damage detection system 300. For example, the weighing applied to the interpolation formulation may depend on how much time passed between consecutive high-resolution image (with higher weighting applied to the pixel values of more recent images). In some implementations, a learning machine (trained to generated interpolated images based on earlier image and a subsequent image) may be applied to the two or more subsets of images to generate the additional new images based on interpolation techniques.

Thus, in embodiments where an image generator is used by the damage detection system, the image generator is configured to generate additional at least one image may be configured to, for example, perform image synthesis operations on the one or more subsets of images, and/or apply interpolation operations to two or more subsets of images from the second set of images. The image generator may also be configured (e.g., when generating new image data based on interpolation) to associate the additional at least one image with a time instance between the latest time instance associated with the two or more images and the earliest of the time instance associated with the two or more subsets of images (e.g., if one high-resolution image was obtained at 9:00 p.m., and the other high-resolution image used for interpolation was obtained at 3:00 p.m., them the time associated with the newly generated interpolated image may be 6:00 p.m.). That time instance associated with the new additional interpolated image can be used to select (e.g., by the image selector 323) a low-resolution image, from the set of low-resolution image, that is associated with an approximately same time instance as the time instance associated with the new interpolated image (e.g., the low-resolution image is within a few minutes, or a few hours, of the time associated with the newly generated interpolated image). That selected low-resolution image and the interpolated high-resolution image can be used to define another (approximated) ground truth to train the damage detector. For example, the interpolated high-resolution image can be processed by the high-resolution model to provide model output data, which may be a marked/labelled image, a vector of values representative of the features and damage detected, or other data to be paired with the data corresponding to the low-resolution image that is then provided to the learning engine controller/adapter 314.

During regular operation of the damage detection system 300, i.e., subsequent to the initial training of the damage detector 310, an image (typically a low-resolution, but possibly high-resolution) is received at the input (e.g., the communication interface 302) to the system 300 (e.g., from a satellite vehicle such as the vehicles 120 or 122) and is directed to both the training image repository 322 and to the damage detector 310. The damage detector 310 is configured to identify objects/features appearing in the image, and determine if any identified object appearing in the image has sustained damage. In some embodiments, detection of damage may be assessed in comparison to an earlier baseline image (e.g., images showing contours of identifiable structures in a geographical area at their pre-damage state). Baseline images, for different geographical areas, capturing the appearance of the respective areas prior to the occurrence of a damage-causing event that may have damaged one or more objects within those respective geographical areas, may be stored in a repository 312 that is coupled to the damage detector 310. When assessment of damage is based on a differential model to determine whether there has been deviation in the visible structural dimensions of identified objects from an earlier baseline image to a current image of the geographical area, the damage detector 310 may be trained using grounds truths that include not only the data corresponding to high-resolution images and their low-resolution counterparts (as described above), but also data corresponding to earlier images based on which the detector uses a model to detect differences between a baseline image and a current image is trained. Thus, FIG. 3 shows that the baseline image repository 312 is optionally coupled to the learning engine controller/adapter 314. In some embodiments, additional processing may be required to be performed on the baseline images used for training (e.g., aligning, segmenting, or feeding a baseline image to some other model to generate compact data representative of the content of the data and classification thereof). On the other hand, in some situations the assessment of damage does not require determining the difference between an earlier image and a current image. For example, when using image data to identify flood damage or fire damage (or even structural damage that is identifiable without needing to refer to an earlier baseline image), such damage determination may be derived directly from the content of a given image (by recognizing image characteristics and content consistent with such types of damage). In the latter embodiments, training of the damage detector 310 would involve providing training data that includes data representative of various types of damages (e.g., fire damage) in different geographical locales, so that the damage detector can be trained to recognize the damage no matter the specific geographical locale corresponding to the image.

The baseline images, which may be high-resolution images or low-resolution images, would generally be associated with positioning information and timing information identifying the particular geographical areas shown in the baseline images, and the times when those images were taken. The specific baseline image corresponding to the current image received at the system 300 can thus be selected based on positioning information associated with the current image. Optionally, in some embodiments, the incoming image may undergo pre-processing (prior to being provided to the damage detector 310) by a pre-processing unit 340 to, for example, align the incoming image with the baseline image that will be used to determine if there has been any damage sustained by any object appearing in the incoming low-resolution image. The aligning process may be similar to the aligning processes described above in relation to the image aligner 328 of the training data generator 320 (e.g., geo-referencing techniques, segmentation techniques, etc.) Additionally, the pre-processing unit 340 may optionally also identify certain features into the image and/or mark objects appearing in the incoming current image using geometrical shapes (e.g., polygonal shapes). Such processing can be performed using a learning engine (which may be different from the damage detector 310), or via filtering-based procedures, and may be similar to the procedures described in relation to the image segmenter 326. If a baseline image is required for the learning engine processing (e.g., if a differential model to assess difference between two images is used; such a model is not necessarily required to detect and assess fire or flood damage), the selected baseline image (marked-up or in original form) and the incoming image are then inputted to the damage detector 310. The images may further be formatted, e.g., using a pre-processing procedure, into records of sizes and types that are compatible with the expected inputs to the damage detector (e.g., into vectors or matrices of pre-determined dimensions).

Thus, based on low-resolution image input to the learning engine 310 identifies features in the input image and determines if the data is indicative of damage (and in some embodiments may also provide an economic assessment of the damage).

The learning engines used by the damage detection system 300, including the damage detector 310 and/or learning engines used for other operations (e.g., feature identification and segmentations, the high-resolution damage detector 330, image synthesis image generation, etc.) may be implemented as neural networks. Such neural networks may be realized using different types of neural network architectures, configuration, and/or implementation approaches. Examples neural networks that may be used include convolutional neural network (CNN), feed-forward neural networks, recurrent neural networks (RNN), etc. Feed-forward networks include one or more layers of nodes ("neurons" or "learning elements") with connections to one or more portions of the input data. In a feedforward network, the connectivity of the inputs and layers of nodes is such that input data and intermediate data propagate in a forward direction towards the network's output. There are typically no feedback loops or cycles in the configuration/structure of the feed-forward network. Convolutional layers allow a network to efficiently learn features by applying the same learned transformation(s) to subsections of the data. Other examples of learning engine approaches/architectures that may be used include generating an auto-encoder and using a dense layer of the network to correlate with probability for a future event through a support vector machine, constructing a regression or classification neural network model that indicates a specific output from data (based on training reflective of correlation between similar records and the output that is to be identified), etc.

Implementation using neural networks can be realized on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural network, processes, and methods described herein. The computing platforms used to implement the neural networks typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc. The various learning processes implemented through use of the neural networks may be configured or programmed using TensorFlow (an open-source software library used for machine learning applications such as neural networks). Other programming platforms that can be employed include keras (an open-source neural network library) building blocks, NumPy (an open-source programming library useful for realizing modules to process arrays) building blocks, etc.

Figure 4:
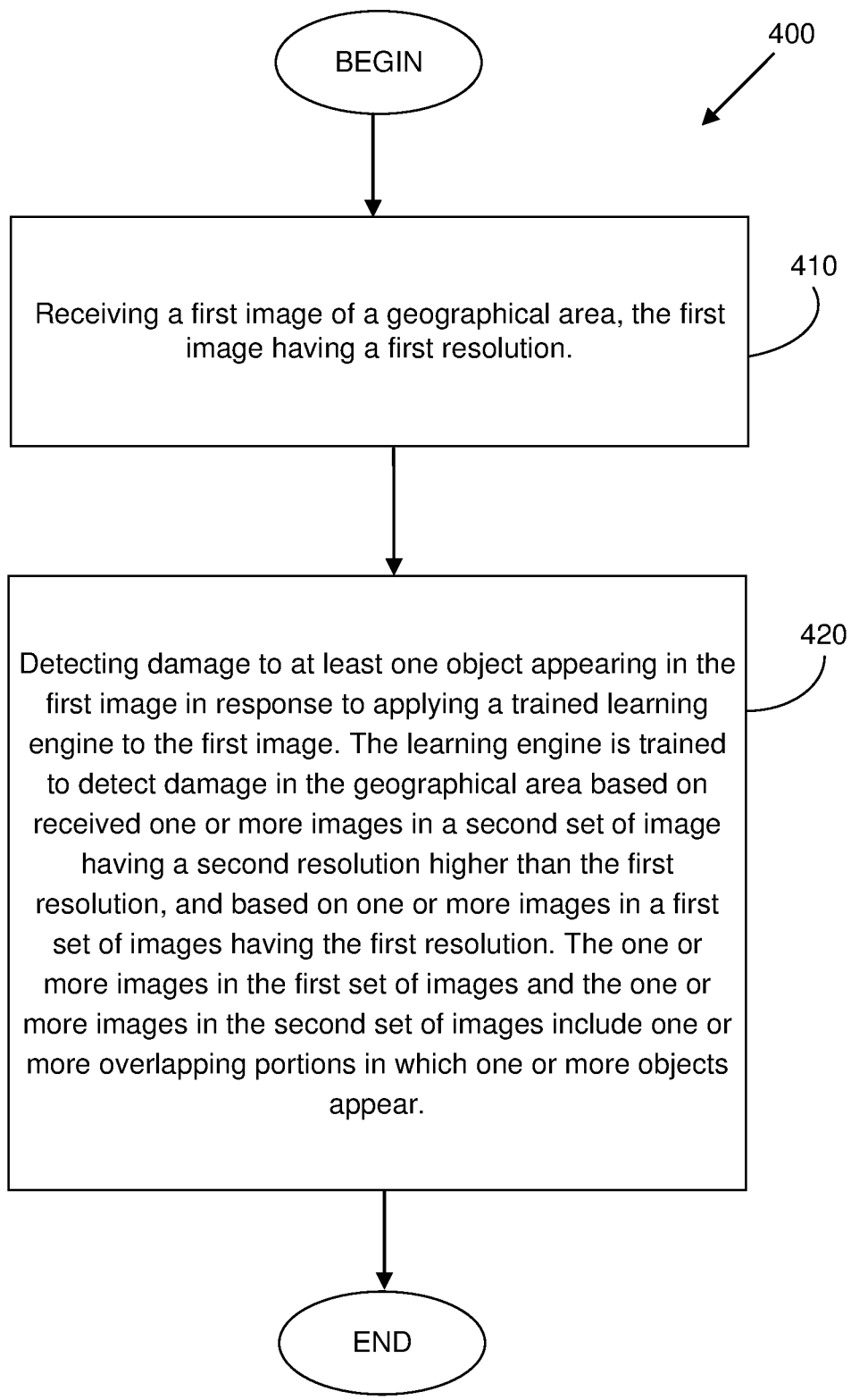
FIG. 4 is a flowchart of an example procedure for detecting damage in a geographical area.

With reference next to FIG. 4, a flowchart of an example procedure 400 for detecting damage in a geographical area is shown. The procedure 400 is typically performed at a system such as the damage detection system 150 of FIG. 1 or the system 300 of FIG. 3. The procedure 400 includes receiving 410 a first image of the geographical area having a first resolution. Typically, the first image (which may be part of a first set of images having the first resolution) is a low-resolution image (such as those obtained by a high-altitude platform like the satellite vehicles 120 and 122 of FIG. 1), but may also be a high-resolution image. The procedure 400 further includes detecting 420 damage to at least one object appearing in the first image in response to applying a trained learning engine (such as the learning engine 310 of FIG. 3) to the first image. The learning engine is trained (e.g., using a training data generator 320 in conjunction with the learning engine controller/adapter 314) to detect damage in the geographical area based on received one or more images in a second set of image having a second resolution higher than the first resolution, and based on one or more images in a first set of images (the images with the higher resolution may have been obtained from a low-flying vehicle, or from a high-flying vehicle with a powerful/sensitive image-capture device). The one or more images in the first set of images and the one or more images in the second set of images include one or more overlapping portions in which one or more objects appear. As noted, the correspondence between the features, as they appear in the low-resolution images, and the same features as they appear in high-resolution images train the learning engine to identify features (and thus identify damage to those features) from low-resolution images.

As noted, in some embodiments, the learning engine may include one or more artificial neural networks. In some embodiments, the first set of images (i.e., the low-resolution images) and the second set of images (the high-resolution images) may include overview photos of the geographical area. The overview photos included in the first set of images may be captured by an image capturing device carried by a satellite vehicle. The second, high-resolution, set of images may be captured by image-capture devices on one or more of, for example, an aerial vehicle such as a plane, a drone, or a satellite vehicle (lower flying or with a better camera than that of the satellite vehicle capturing the low-resolution images). In some examples, the first set of images and the second set of images include subsets of images (with each subset associated with a time instance, and with each interval between consecutive time instances associated with subsets from the first set of images being shorter than any interval between consecutive times instances associated with subsets from the second set of images. In other words, the refresh rate of the low-resolution images is faster than the refresh rate of the high-resolution images).

In some embodiments, the procedure of FIG. 4 may further include generating additional at least one image for the second set of images based on one or more subsets of images, and associating the additional at least one image with a time instance derived based on the one or more subsets of images. Generating the additional at least one image may include one or more of, for example, performing image synthesis operations on the one or more subsets of images, and/or applying interpolation operations to two or more subsets of images from the second set of images. The procedure of FIG. 4 may further include associating the additional at least one image of the second set of images with a further at least one image from the first set of images in response to a determination that the additional at least one image from the second set of images and the additional at least one image from are associated with approximately a same time instance (e.g., within minutes or hours of each other, depending on the general time frame for acquiring images), and training the learning engine according to a ground truth training set comprising the additional at least one image from the second set of images, generated based on the interpolation operations, and the associated additional at least one image from the first set of images. In embodiments in which the new image is generated based on interpolation techniques, associating the additional at least one image with the time instance may include associating the at least one image with a time instance between a latest time instance associated with the two or more subsets of images and an earliest of the time instance associated with the two or more subsets of images.

In some examples, the procedure 400 may further include receiving at least one image having the second resolution, the at least one image associated with at least one image from the first set of images, and updating the learning engine based on the at least one image having the second resolution, and the associated at least one image from the first set of images. This allows dynamic adaptation of the learning engine in response to new training data (in the form of high-resolution images) becoming available. Updating the learning engine may include associating the at least one image from the second set of images set with the at least one image from the first set of images in response to a determination that the at least one image from the second set of images and the at least one image from the first set of images were captured at approximately the same time, and training the neural network according to a ground truth training set comprising the at least one image from the second set of images and the associated at least one image from the first set of images. The at least one image from the second set of images and the associated at least one image from the first set of images may define a ground truth image set for updating the learning engine.

In some embodiments, associating the at least one image from the second set of images with the at least one image from the first set of images may include aligning the at least one image from the second set of images set with the at least one image from the first set of images. In such embodiments, the aligning may include aligning the at least one image from the second set of images set with the at least one image from the first set of images according to geo-referencing information associated with the at least one image from the second set of images and with the at least one image from the first set of images. In some examples, aligning the at least one image from the second set of images set with the at least one image from the first set of images may include identifying markers in the at least one image from the second set of images and in the at least one image from the first set of images, and registering in the at least one image from the second set of images, the at least one image from the first set of images, or both to a common frame of reference to align at least some of the markers in the at least one image from the second set with respective markers in the at least one image from the first set of images. In alternative embodiments, aligning the at least one image from the second set of images set with the at least one image from the first set of images may include aligning the at least one image from the second set of images and the at least one image from the first set of images based on image perspective information associated with the respective at least one image from the second set of images and the at least one image from the first set of images.

In some examples, training the learning engine according to a ground truth training set including the at least one image from the second set of images and the associated at least one image from the first set of images may include generating detection data for the at least one image from the second set of images according to a model that is based on damage detection from images having the second, higher, resolution, and training the learning engine to generate data, responsive to the associated at least one image from the first set of images, consistent with the detection data generated according to the model based on damage detection from images having the second, higher, resolution.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for detecting damage in a geographical area, the method comprising:
receiving a first image of the geographical area, the first image having a first resolution; and
detecting damage to at least one object appearing in the first image in response to applying a trained learning engine to the first image, wherein the learning engine is trained to detect damage in geographical areas based on received one or more images in a second set of images having a second resolution higher than the first resolution, and based on one or more images in a first set of images having the first resolution, and wherein the one or more images in the first set of images and the one or more images in the second set of images include one or more overlapping portions in which one or more objects appear, wherein the first set of images and the second set of images include subsets of images, with each subset associated with a time instance, and wherein each interval between consecutive time instances associated with subsets from the first set of images is shorter than any interval between consecutive times instances associated with subsets from the second set of images.

2. The method of claim 1, further comprising:
receiving at least one image from the second set of images having the second resolution, the at least one image associated with at least one image from the first set of images; and
updating the learning engine based on the at least one image having the second resolution, and the associated at least one image from the first set of images.

3. The method of claim 2, wherein updating the learning engine comprises:
associating the at least one image from the second set of images set with the at least one image from the first set of images in response to a determination that the at least one image from the second set of images and the at least one image from the first set of images were captured at approximately the same time; and
training the learning engine according to a ground truth training set comprising the at least one image from the second set of images and the associated at least one image from the first set of images, wherein the at least one image from the second set of images and the associated at least one image from the first set of images define a ground truth image set for updating the learning engine.

4. The method of claim 3, wherein associating the at least one image from the second set of images with the at least one image from the first set of images comprises:
aligning the at least one image from the second set of images set with the at least one image from the first set of images.

5. The method of claim 4, wherein aligning the at least one image from the second set of images set with the at least one image from the first set of images comprises:
aligning the at least one image from the second set of images set with the at least one image from the first set of images according to geo-referencing information associated with the at least one image from the second set of images and with the at least one image from the first set of images.

6. The method of claim 4, wherein aligning the at least one image from the second set of images set with the at least one image from the first set of images comprises:
identifying markers in the at least one image from the second set of images and in the at least one image from the first set of images; and
registering in the at least one image from the second set of images, the at least one image from the first set of images, or both to a common frame of reference to align at least some of the markers in the at least one image from the second set with respective markers in the at least one image from the first set of images.

7. The method of claim 4, wherein aligning the at least one image from the second set of images set with the at least one image from the first set of images comprises:
aligning the at least one image from the second set of images and the at least one image from the first set of images based on image perspective information associated with the respective at least one image from the second set of images and the at least one image from the first set of images.

8. The method of claim 3, wherein training the learning engine according to a ground training set comprising the at least one image from the second set of images and the associated at least one image from the first set of images comprises:
generating detection data for the at least one image from the second set of images according to a model that is based on damage detection from images having the second, higher, resolution; and
training the learning engine to generate data, responsive to the associated at least one image from the first set of images, consistent with the detection data generated according to the model based on damage detection from images having the second, higher, resolution.

9. The method of claim 1, wherein the learning engine comprises one or more artificial neural networks.

10. The method of claim 1, wherein the first set of images and the second set of images include aerial photos of the geographic area.

11. The method of claim 10, wherein the aerial photos included in the first set of images are captured by an image capturing device carried by a satellite vehicle.

12. The method of claim 10, wherein the aerial photos included in the second set of images are captured by image capture devices on one or more of: a satellite vehicle, or an aerial vehicle.

13. The method of claim 1, further comprising:
generating additional at least one image for the second set of images based on one or more subsets of images; and
associating the additional at least one image with a time instance derived based on the one or more subsets of images.

14. The method of claim 13, wherein generating the additional at least one image comprises one or more of:
performing image synthesis operations on the one or more subsets of images; or applying interpolation operations to two or more subsets of images from the second set of images.

15. The method of claim 14, further comprising:
associating the additional at least one image of the second set of images with a further at least one image from the first set of images in response to a determination that the additional at least one image from the second set of images and the additional at least one image from are associated with approximately a same time instance; and
training the learning engine according to a ground training set comprising the additional at least one image from the second set of images, generated based on the interpolation operations, and the associated additional at least one image from the first set of images.

16. A system comprising:
a communication interface to receive a first image of a geographical area, the first image having a first resolution; and
a controller, implementing one or more learning engines, coupled to the communication interface, and further coupled to a memory device to store programmable instructions to:
detect damage to at least one object appearing in the first image in response to applying a trained learning engine to the first image, wherein the learning engine is trained to detect damage in geographical areas based on received one or more images in a second set of images having a second resolution higher than the first resolution, and based on one or more images in a first set of images having the first resolution, and wherein the one or more images in the first set of images and the one or more images in the second set of images include one or more overlapping portions in which one or more objects appear, wherein the first set of images and the second set of images include subsets of images, with each subset associated with a time instance, and wherein each interval between consecutive time instances associated with subsets from the first set of images is shorter than any interval between consecutive times instances associated with subsets from the second set of images.

17. The system of claim 16, wherein the communication interface is configured to receive at least one image having the second resolution, the at least one image associated with at least one image from the first set of images, and wherein the controller is configured to update the learning engine based on the at least one image having the second resolution, and the associated at least one image from the first set of images.

18. The system of claim 17, wherein the controller configured to update the learning engine is configured to:
associate the at least one image from the second set of images set with the at least one image from the first set of images in response to a determination that the at least one image from the second set of images and the at least one image from the first set of images were captured at approximately the same time; and
train the learning engine according to a ground training set comprising the at least one image from the second set of images and the associated at least one image from the first set of images, wherein the at least one image from the second set of images and the associated at least one image from the first set of images define a ground truth image set for updating the learning engine.

19. The system of claim 16, wherein the first set of images includes satellite photos of the geographic area captured by an image capturing device carried by a satellite vehicle, and wherein the second set of images include aerial photos of the geographic area captured by another image capturing devices carried by a low-flying aerial platform.

20. A non-transitory computer readable media storing a set of instructions, executable on at least one programmable device, to:
receive a first image of a geographical area, the first image having a first resolution; and detect damage to at least one object appearing in a first image in response to applying a trained learning engine to the first image, wherein the learning engine is trained to detect damage in geographical areas based on received one or more images in a second set of images having a second resolution higher than the first resolution, and based on one or more images in the first set of images, and wherein the one or more images in a first set of images and the one or more images in the second set of images include one or more overlapping portions in which one or more objects appear, wherein the first set of images and the second set of images include subsets of images, with each subset associated with a time instance, and wherein each interval between consecutive time instances associated with subsets from the first set of images is shorter than any interval between consecutive times instances associated with subsets from the second set of images.

* * * * *